United States Patent

Bosch

[11] 4,370,729
[45] Jan. 25, 1983

[54] MICROPROGRAM SEQUENCER

[75] Inventor: Eugen I. Bosch, Tustin, Calif.

[73] Assignee: Point 4 Data Corporation, Irvine, Calif.

[21] Appl. No.: 132,797

[22] Filed: Mar. 21, 1980

[51] Int. Cl.² .............................................. G06F 9/22
[52] U.S. Cl. .................................... 364/200; 364/900
[58] Field of Search ... 364/200 MS File, 900 MS File

[56] References Cited

U.S. PATENT DOCUMENTS 4,155,120  5/1979  Keefer et al. ...................... 364/200

Primary Examiner—Gareth D. Shaw
Assistant Examiner—T. Flyntz
Attorney, Agent, or Firm—Marvin H. Kleinberg

[57] ABSTRACT

A microprogram sequencer for generating in a proper sequence the addresses of the successive microinstructions used in executing a given machine instruction includes a PROM next address generator that produces the successive addresses. The successive addresses are utilized as the successive microinstructions. Each address produced includes a normal next address, but this normal next address may be alterable by address alteration signals that are generated in response to a number of sensed conditions within the computer and in response to predetermined machine instruction register bits. The address alteration of a normal next address, if required, is accomplished within the same clock period in which the normal next address is initially formed, permitting jump or branch instructions to be performed as rapidly as normal instructions. No mapping PROM, microsequencer counter, nor microsequencer incrementer are needed to implement the present invention.

7 Claims, 6 Drawing Figures

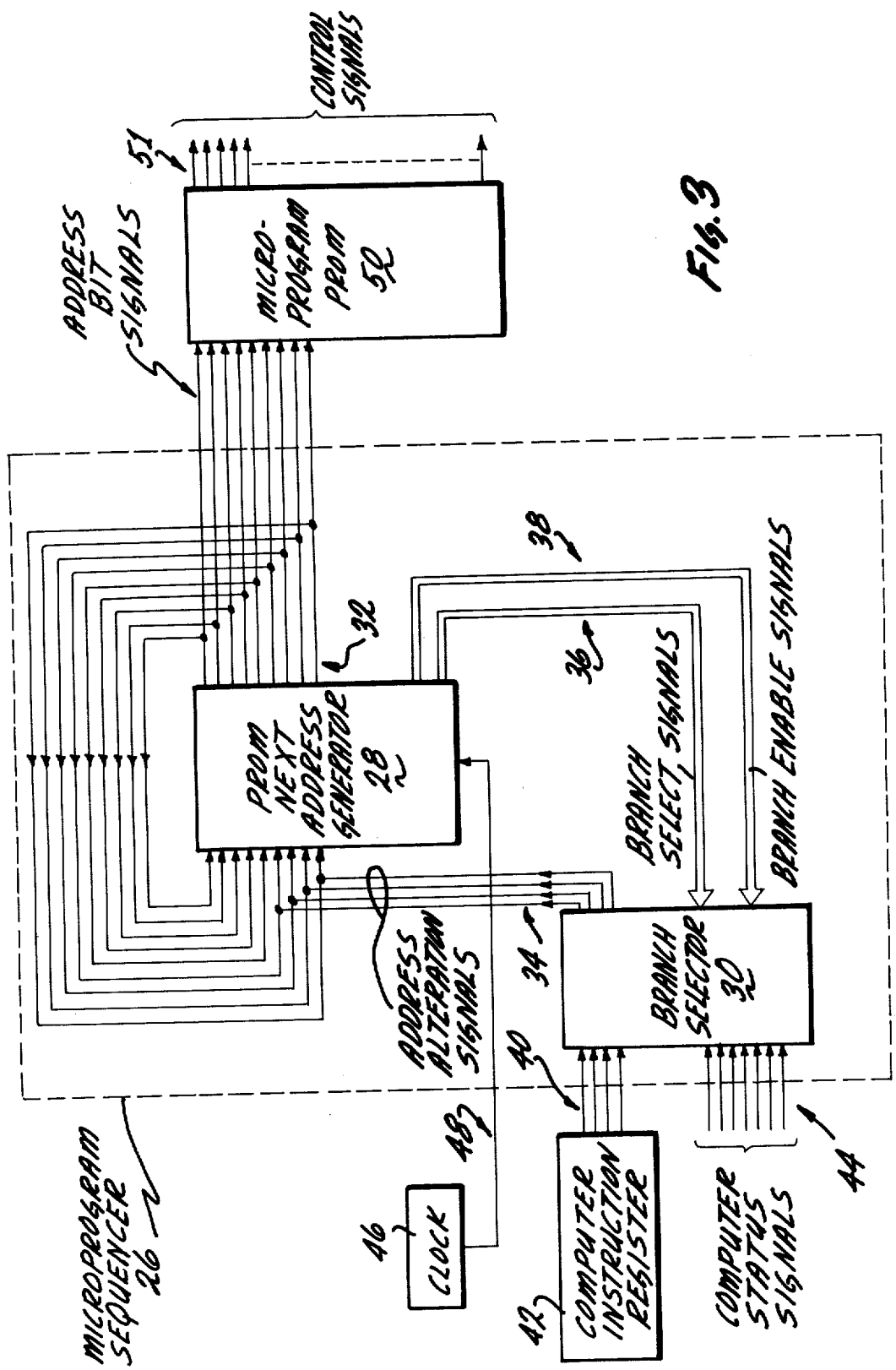

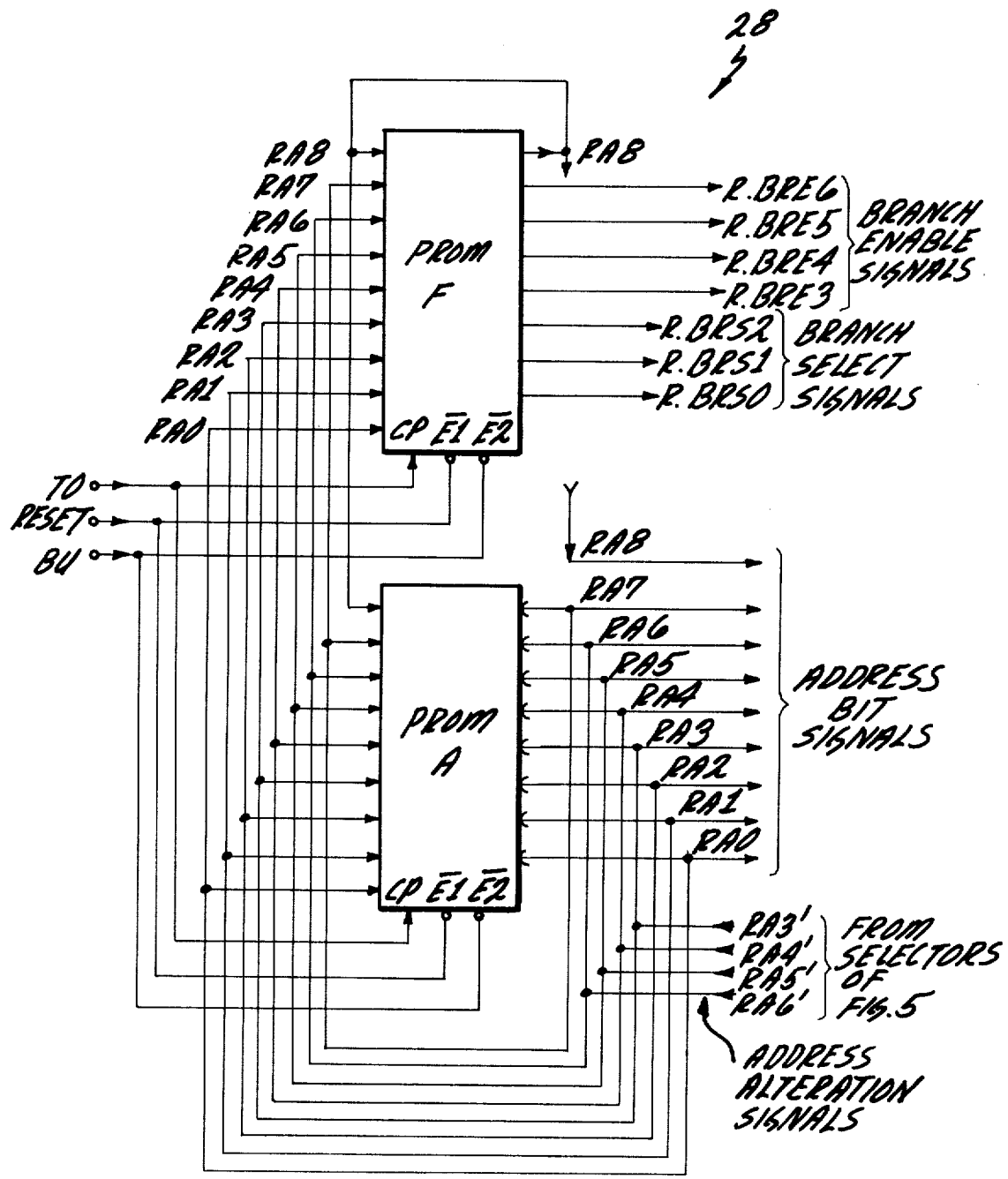

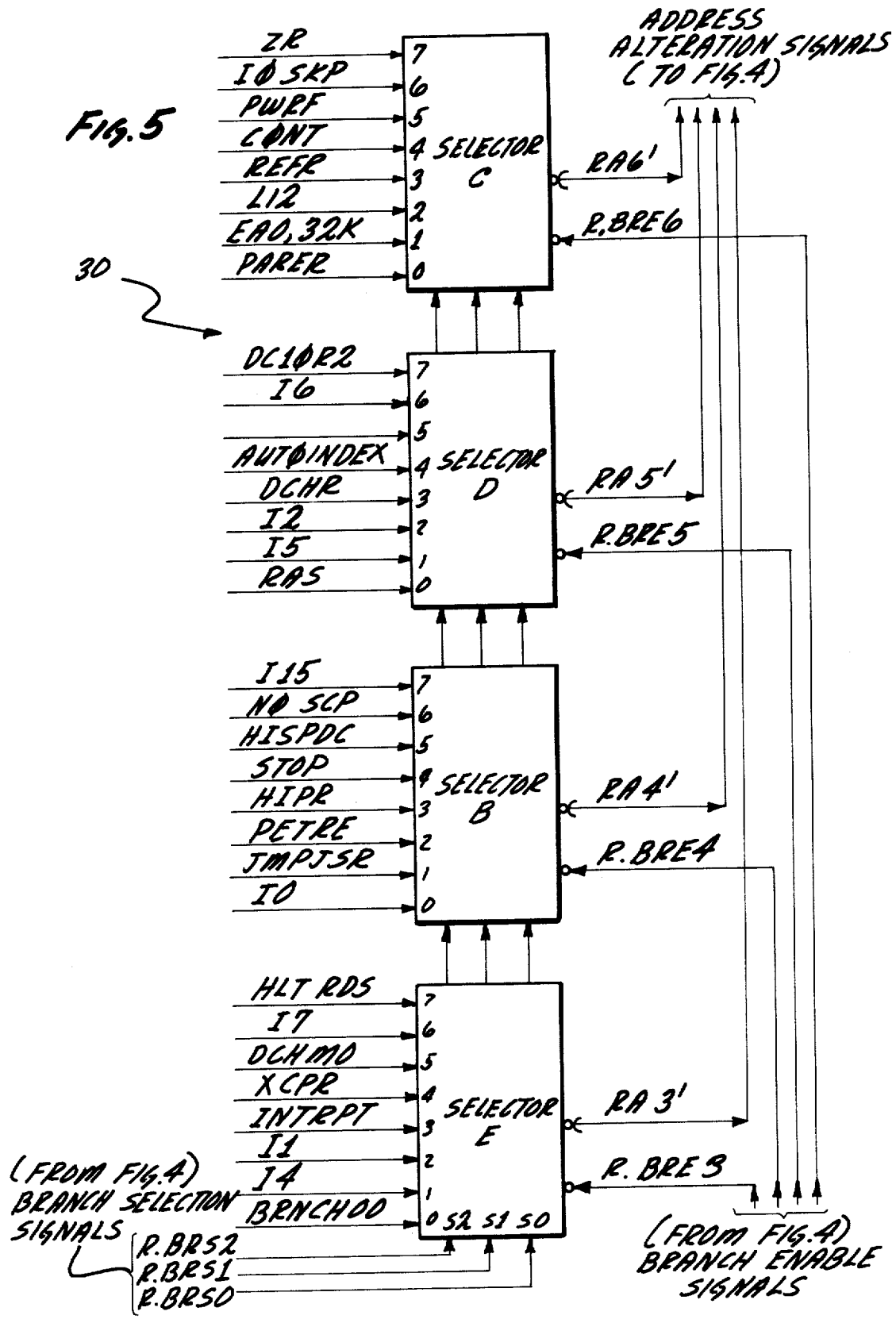

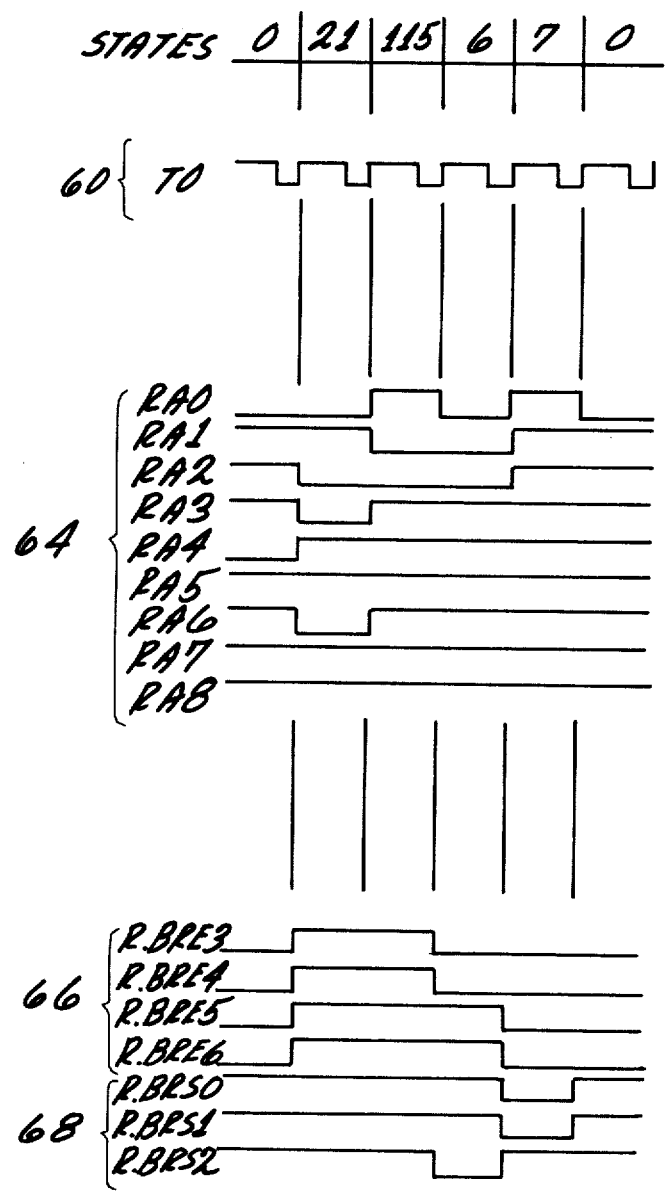

MICROPROGRAM SEQUENCER

BACKGROUND OF THE INVENTION

1. Field of the Invention

The present invention is in the field of computers and more specifically relates to a microprogram sequencer for determining the sequence of microinstructions that are used to execute a microprocessor machine instruction.

2. The Prior Art

In a microprogrammed computer, each machine instruction is implemented by a sequence of microinstructions which are stored within the microcomputer in a microprogram memory.

The sequence of microinstructions corresponding to a particular machine instruction operates the various parts of the central processing unit of the microcomputer in a particular sequence to execute the machine instruction.

Typically, in some microcomputers the operations of the various parts are controlled by enabling signals. The state of the microcomputer is uniquely specified by the set of enabling signals. During any specific clock interval, the values (levels) of the enabling signals are constant and are determined by the microinstruction being executed during that clock interval. Each microinstruction determines the states of all the enabling signals during a brief time interval.

Typically, each microinstruction is embodied in the microprocessor as an ordered set of binary digits. The microinstructions are typically stored in a ROM in the control unit of the microprocessor. Each of the binary digits may be used as one of the enabling signals during the interval over which the microinstruction is effective. Alternatively, the binary digits of a microinstruction may be decoded to obtain the values of the enabling signals.

In a typical microprocessor, a portion of the machine instruction is used to address a mapping PROM in which is stored the starting address of the microinstruction sequence that implements the machine instruction. This starting address is applied to the microprogram PROM to obtain the first microinstruction. A microsequencer is provided which in succession generates the addresses of the succeeding microinstructions by periodically incrementing a counter, the count of which is the address. These successive addresses are applied to the microprogram PROM to access the succeeding microinstructions making up the machine address.

While this method of sequencing the microinstructions is known to be feasible for some types of microprocessors, it is not as efficient as the system of the present invention, which does not require the use of a microsequencer counter.

It is known in the art to include provision for the microprogram to jump out of sequence when certain conditions are met. This is accomplished by providing in each microinstruction a field for an alternate next microinstruction address which is invoked when some certain condition obtains.

As implemented in prior art systems, this technique typically requires two clock periods to execute. During the first clock period, the conditional branching instruction is executed and upon recognition of the branching condition, the address of the alternative microinstruction is determined. During the next clock period, the microsequencer counter is loaded to the address of the alternative microinstruction, and then in the third clock period the alternative microinstruction is executed.

As will be discussed below, the present invention can handle conditional branch instructions more efficiently so that a clock period is saved each time a conditional branch instruction is executed.

SUMMARY OF THE INVENTION

No microsequencer counter is used in the microprogram sequencer of the present invention. Instead, in a preferred embodiment the present invention makes use of a recently-developed PROM which includes an on-chip edge-triggered output register. Following the positive-going edge of a clock pulse, the address and the output enabling inputs are free to change, and any changes therein do not affect the contents of the output register until the next positive-going clock pulse edge occurs.

In accordance with the present invention, certain branch-alterable bits of the address output from a PROM mechanized next-address-generator, utilizing PROMS of the type described above, may be altered in response to signals sensed in the microprocessor; these signals tell the condition or state of various components of the microprocessor, including the states of predetermined digits of the machine instruction register.

The other non-branch-alterable bits of the address output from the PROM next-address-generator remain latched in the output register of the PROM pending application of the next positive-going clock pulse edge.

Much of the power of the present invention derives from the manner in which signals for altering the aforementioned branch-alterable bits are derived from the conditions sensed. In a preferred embodiment, this is accomplished by use of ancillary selector logic. Signals indicating the status or condition of various components in the microprocessor, including predetermined digits of the instruction register, are applied as input to the selector logic.

Also applied to the selector logic are a number of branch select signals that are generated by the PROM next-address-generator. The branch select signals determine which ones of the applied condition-indicating signals are to be effective in determining the final state of the branch-alterable bits produced by the next-address-generator.

The next-address-generator also generates as an output at each positive-going clock signal, a set of branch-enabling signals. Each of these signals enables generation by the selector logic of an alteration of a particular one of the branch-alterable bits.

Thus, in each clock period the PROM next-address-generator is presented with an input address that is initially based on the present address and which may be altered within the same clock period in response to selected conditions within the microprocessor. Using these inputs, the PROM next-address-generator generates the next address upon the next positive-going edge of the clock pulse. The successive addresses are directly utilized as the successive microinstruction codes.

It should be noted that because the address setup time of the PROM next-address-generator is on the order of 50 ns and its clock-to-output time is on the order of 20 ns, the next-address-generating technique discussed above is capable of extremely fast operation and, moreover, a jump or branch takes the same time, one clock period, as a normal next address.

It is particularly noteworthy that the sequencer of the present invention employs neither a microsequencer counter for stepping through the addresses of the successive microinstruction that execute a machine instruction, nor a mapping PROM such as is typically used to set the microsequencer counter to a proper starting address for a particular machine instruction. In addition, when a jump or branch instruction is to be performed, it is not necessary to waste a clock period loading the microsequencer counter to the address of the next microinstruction. For this reason, the present invention can execute jump instructions at previously unattainable speeds.

The novel features which are believed to be characteristic of the invention, both as to organization and method of operation, together with further objects and advantages thereof, will be better understood from the following description considered in connection with the accompanying drawings in which a preferred embodiment of the invention is illustrated by way of example. It is to be expressly understood, however, that the drawings are for the purpose of illustration and description only, and are not intended as a definition of the limits of the invention.

BRIEF DESCRIPTION OF THE DRAWINGS

FIG. 3 is a block diagram illustrating the concept of the computer control unit in accordance with the present invention;

FIG. 4 is a block diagram of the PROM next-address-generator in a preferred embodiment of the present invention;

FIG. 5 is a block diagram of the selector in a preferred embodiment of the present invention; and FIG. 6 is a composite graph showing a number of waveforms vs. time as generated during successive clock intervals by the computer control unit of the preferred embodiment during execution of an ADD instruction.

DETAILED DESCRIPTION OF THE PREFERRED EMBODIMENT

Figure 1:
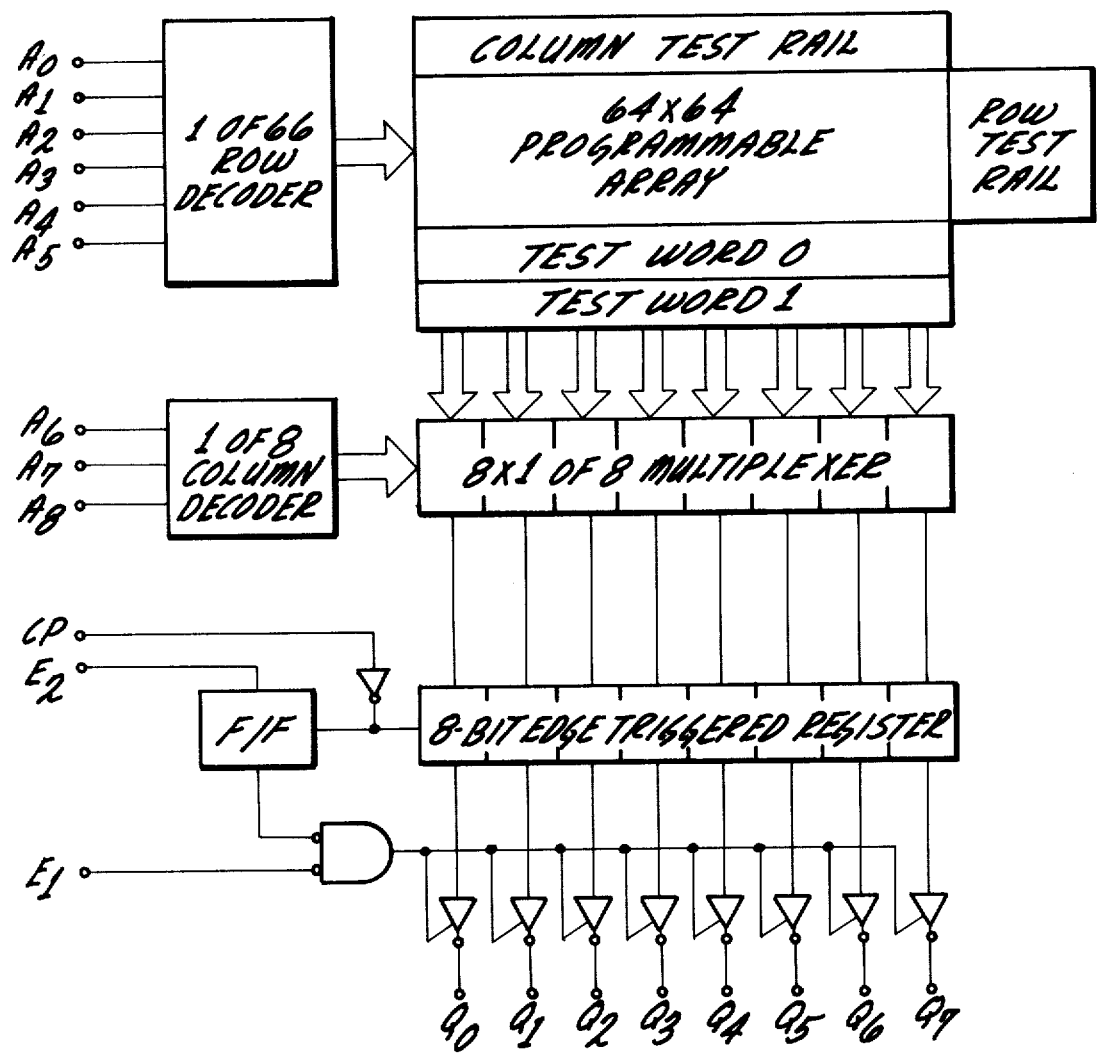
FIG. 1 is a block diagram of a type of programmable read only memory known in the prior art and used in a preferred embodiment of the present invention.

FIG. 1 shows a programmed read only memory of a type which exemplifies the type of PROM used in the PROM next-address-generator in a preferred embodiment of the present invention. The exemplary PROM shown in FIG. 1 is manufactured by Advanced Micro Devices, Inc. of Sunnyvale, Calif. and is specified by the catalog number AM29774. The PROM is capable of storing 512 8-bit words. It employs an open collector output circuit and includes provision for both synchronous and asynchronous output enables.

The PROM is manufactured with a conductive link at each bit location in the memory. The fuseable links are opened one-at-a-time by passing current through them to permanently store data in the memory.

Reading of the data is accomplished by applying the binary word address to the address inputs $A_0$-$A_8$, and applying a logic LOW to the synchronous output enable, $E_2$. During the address setup time, stored data is accessed and loaded into the master flip-flops of the data register. Since the synchronous enable setup time is less than the address setup requirement, additional decoding delays may occur in the enable path without reducing memory performance. Upon the next LOW-to-HIGH transition of the clock CP, data is transferred to the slave flip-flops which drive the output buffers. Providing the asynchronous enable $E_1$ is also LOW, stored data will appear on the outputs $Q_0$-$Q_7$. If $E_2$ is HIGH when the positive clock edge occurs, outputs go to the OFF or high impedance state. The output may be disabled at any time by switching $E_1$ to a HIGH level.

Following the positive clock edge, the address and synchronous enable inputs are free to change; changes do not affect the outputs until another positive clock edge occurs. This unique feature allows the PROM decoders and sense amplifiers to access the next location while previously addressed data remains stable on the outputs. For less complex applications, either enable may be effectively eliminated by tying it to ground. As will be seen below, the advantage of this type of PROM as applied in the present invention is that the output is maintained in the output register for an entire clock period, during which time a new input address may be built up for use at the end of the clock period and without disturbing the existing PROM output. Moreover, it will be shown that by utilization of the concepts of the present invention, within each clock period, chosen output bits of the PROM can be selectively altered to thereby permit a branch controlled selection of the next PROM output at the end of the clock period.

Figure 2:
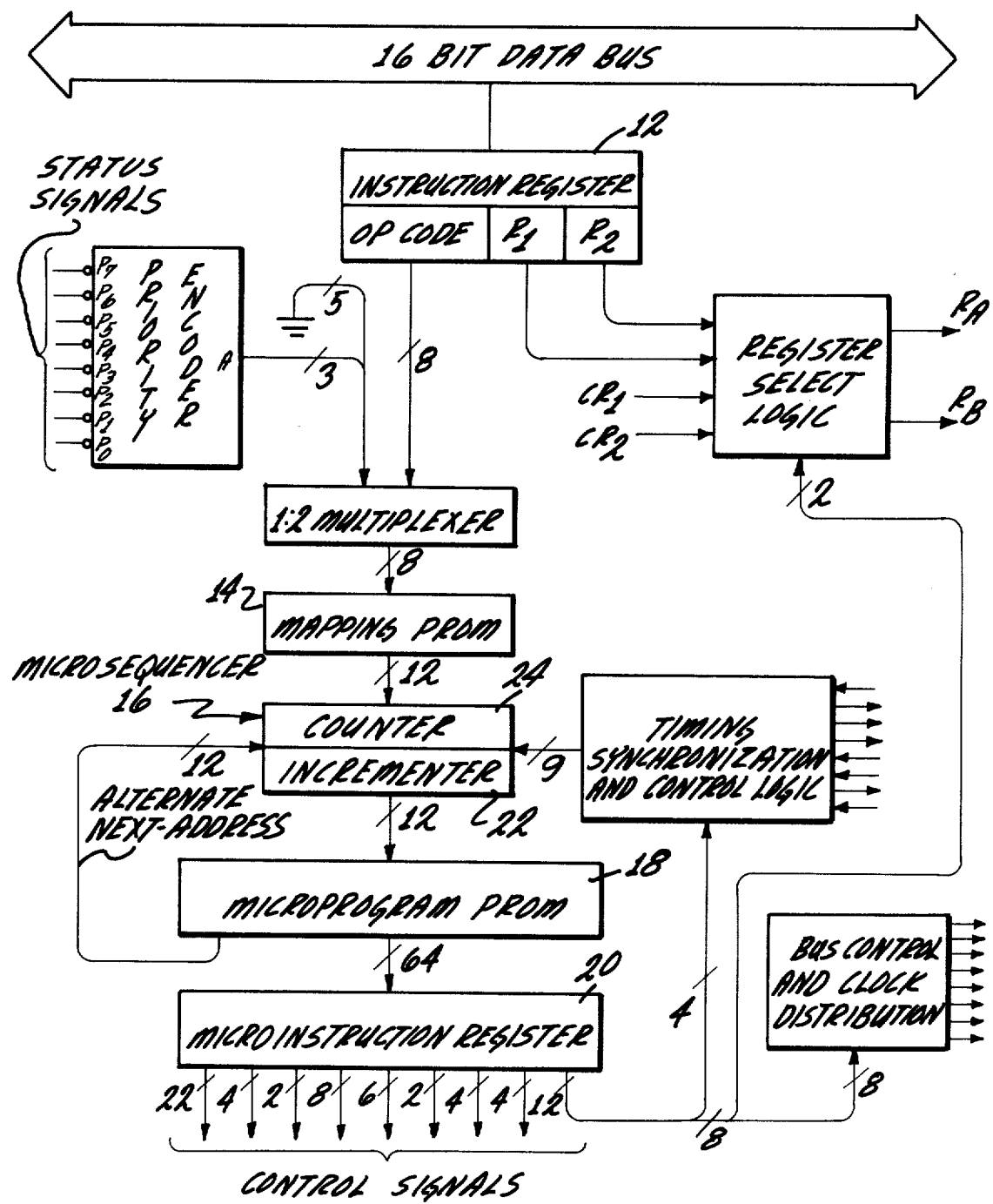
FIG. 2 is a block diagram of a type of computer control unit known in the prior art.

FIG. 2 shows a typical computer control unit of the prior art in block diagram form. The instruction register 12 contains the current machine level instruction that is being interpreted and executed by the microprogram. The operational code portion of the instruction is presented to a mapping PROM 14 as an address. In turn, the output of the mapping PROM 14 provides the microsequencer 16 with the starting address of the microprogram that satisfies the requirements of the current instruction.

The starting address is passed directly through the microsequencer 16 to the address field of the microprogram PROM 18. The first microinstruction appears at the output of the microprogram PROM 18 some time later and is loaded into the microinstruction register 20 on the rising edge of the next clock pulse. When the starting address is passed directly to the microprogram PROM 18, an incrementer 22 inside the microsequencer 16 adds one to the starting address and sets up the input to the microprogram counter 24, which is reloaded with "address-plus-one" by the same clock pulse that loaded the microinstruction register 20. Subsequently, the source of the microprogram PROM address is switched from the mapping PROM 14 to the microprogram counter 24 and the process continues on subsequent microinstructions.

This prior art microsequencer is based on the use of the mapping PROM 14, the microsequencer incrementer 22, and the microprogram counter 24, all of which are eliminated by the present invention.

When a jump instruction is to be executed by the prior art computer control unit shown in FIG. 2, the conditional branching instruction is executed during a first clock period in which the address (alternate next-address) of the alternative microinstruction is determined. The microsequencer counter 24 is loaded to the address of the alternative microinstruction during a second clock period, and the alternative microinstruction is then executed during a third clock period. As will be evident from the discussion below, conditional branch instructions can be handled more efficiently by the microsequencer of the present invention.

FIG. 3 is a block diagram which illustrates the concept of the computer control unit in accordance with the present invention.

Referring to FIG. 3, it is seen that the computer control unit of the present invention does not include a mapping PROM of the type used in the prior art system shown in FIG. 2 to provide the initial address for a given machine instruction. In contrast, in the present invention the same initial address may be utilized for performance of each machine instruction and such initial address is zero in the particular described embodiment of the present invention. From this initial zero address, the microprogram sequencer 26 of the present invention jumps to the next address in accordance with the machine instruction to be executed.

Also conspicuously absent from the computer control unit of the present invention are the microsequencer counter and incrementer (24, 22 of FIG. 2) typically used in the prior art. These components are unnecessary in the present invention because in the present invention each microprogram instruction address is derived from the address of the preceding microinstruction, modified if necessary in response to certain status signals that are indicative of the condition of various portions of the microcomputer, as will be discussed in greater detail below.

Successive microinstruction addresses are produced by the PROM next-address generator 28 on the lines 32. As shown in FIG. 3, the output address signals on the lines 32 are fed back for use as input addresses to the PROM next-address generator 28. It is seen that some of the bits of the address on the lines 32 can be altered by the signals on the lines 34 produced by the branch selector 30. The selector 30 produces the address alteration signals on the lines 34 in response to certain outputs of the PROM next-address generator 28 that are denoted as branch select signals on the lines 36 and branch enable signals on the lines 38. The selector 30 is also responsive to certain bits of the computer instruction register 42 presented on the lines 40 and to status signals on the lines 44, representing the state or condition of various components throughout the microcomputer. Thus, the PROM selector 30 is responsive to three different classes of signals to produce the address alteration signals on the lines 34: the branch select signals and branch enable signals; the status signals; and selected bits of the machine instruction register.

If it were not for the address alteration signals, the PROM next-address generator 28 would produce a single sequence over successive clock periods that would be completely deterministic, and therefore only a single machine instruction could be executed. This would be unsatisfactory because many different machine instructions must be executed and also as a practical matter the computer control unit must be responsive to non-deterministic events such as interrupts.

The PROM next-address generator 28 is preferably implemented by the use of PROMS of the type shown in FIG. 1. The advantage of this type of PROM is that it has a self-contained output register whose status remains fixed during a particular clock period even though the inputs may be altered during the clock period. It is the value of the input at the leading edge of the next clock pulse that determines the output during the next clock period.

The initial address on the lines 32 is zero, but during the initial clock period, the selector 30 in response to the signals applied to it may rapidly generate address alteration signals on the lines 34, which alter the corresponding address bits (on lines 32) presented to the PROM next-address generator 28. Such alteration is completed at the very beginning of the initial clock period and long before the occurrence of the leading edge of the next clock pulse. Thus, when the next clock pulse occurs, the desired input address (whether altered or unaltered) will be present at the input terminals of the PROM next address generator 28. In response to this input address, the PROM next-address generator 28 produces the next address on the lines 32 during the next clock period.

The successive addresses (whether altered or unaltered) produced on the lines 32 during successive clock periods are applied to the microprogram PROM which decodes each address to produce control signals on the lines 51 that are used to control the operation of various components of the computer.

FIG. 4 and FIG. 5 show the manner in which the block diagram of FIG. 3 is implemented in a preferred embodiment. As shown in FIG. 4, the PROM next-address generator 28 is implemented by means of the two PROMs A and F shown in FIG. 4. Similarly, the selector 30 of FIG. 3 is implemented in a preferred embodiment by the selectors B, C, D, and E shown in FIG. 5. The multiple module implementations of FIG. 4 and FIG. 5 are mechanizations using the limited size currently available PROMs and selectors.

As shown in FIG. 4, the PROM A produces the address bits RA0–RA7, while the PROM F produces the address bit RA8. These address bit outputs are presented by open collector outputs on the PROMs. This is an important consideration for the address bits RA3–RA6 which, as will be seen below, may be altered or modified in response to various status signals and various bits of the machine instruction register.

As shown in FIG. 4, the PROM F also produces four branch enable signals designated as R.BRE3 through R.BRE6. Also, the PROM F generates in each clock cycle the three branch select signals R.BRS0 through R.BRS2. Both the branch enable signals and the branch select signals generated by the PROM F are applied to the selectors B, C, D, and E of FIG. 5. The input TO applied to the PROMs in F is the main 100 ns clock pulse, and the signal BU is a battery backup signal.

As shown in FIG. 5, the three branch select signals, R.BRS0 through R.BRS2, generated by the PROM F of FIG. 4 are applied to the selectors B, C, D, and E of FIG. 5. These three signals constitute a three-bit code which tells each of the selectors B, C, D, and E which one of its inputs to select as its output. That is, each of the selectors B, C, D, and E has eight inputs, and for a particular three-bit code, say 110, each of the selectors B, C, D, and E would select its seventh input for use as a potential output. Whether the four potential outputs are used or not depends on whether the branch enable signals, R.BRE3 through R.BRE6 are present. These four branch enabling signals are selectively produced by the PROM F of FIG. 4 and are applied as shown in FIG. 5 to the selectors E, B, D, and C, respectively, to enable the outputs designated as RA3' through RA6'. The outputs RA3' through RA6' are presented at open collector outputs of the selectors, as were the outputs RA3 through RA6 of the PROM A of FIG. 4. Because the outputs RA3 through RA6 from PROM A and the outputs RA3' through RA6' of the selectors E, B, D, and C are presented at open collector output terminals, either of the two signals corresponding to a particular address bit can pull the bit LOW. It is this logical combining of the address alteration signals produced in FIG. 5 with the normal next address signals produced by the PROM A in FIG. 4 that permits certain bits of the next address to be altered in response to the various input conditions and pertinent bits of the machine instruction register and thereby accomplish branching or jump operations of the microprogram sequencer.

As shown in FIG. 5, signals representing certain bits of the machine or computer instruction register are applied to the selectors B, D, and E. Only certain predetermined bits of the instruction register are sensed because only certain bits relate to branching. For example, in a particular computer with which the microprogram sequencer may be utilized, the bits $I_0$, $I_1$ and $I_2$ serve to distinguish between input/output instructions, memory reference instructions, and ALU instructions. $I_0$ is the most significant bit of the instruction register, while $I_{15}$ is the least significant bit.

Signals representing the status of various components of the computer are applied to the selectors B, C, D, and E as indicated at the left side of the PROMs in FIG. 5. The significance of each of these signals in the particular computer is given in the following Table 1.

TABLE I

| | |
|---|---|
| ZR | Zero Result on Main Data Bus |
| IOSKP | Input/Output Skip Instruction |
| PWRF | Power Fail Early Warning |
| CONT | CONTINUE Signal from Mini-panel |
| REFR | Refresh |
| L12 | Bit 12 of Effective Address Latch |
| EA0.32K | Bit 0 of Effective Address in 32K Addressing Mode |
| PARER | Parity Error Signal |
| DC1OR2 | Device Code 1 or 2 |
| AUTOINDEX | EA register contains a value between 20 and 37 incl. |
| DCHR | Data channel service request |
| RAS | Row Address Strobe |
| NOSCP | No STRT, CLR or IOPLS with I/O instruction |
| HISPDC | Highspeed data channel report |
| STOP | STOP Signal from Mini-panel |
| HIPR | High speed Inter-Processor Bus service request |
| PETRE | Parity error trap enable |
| JMPJSR | JMP (JUMP) or JSR (jump subroutine) in IR |
| HLT.RDS | Halt or Read Switches Instruction |
| DCHMO | Data Channel Mode |
| XCPR | External Control Panel Service Request |
| INTRPT | Interrupt |
| BRNCH00 | Branching logic in state 00 |
| $I_0$–$I_2$, $I_4$–$I_7$, $I_{15}$ | SELECTED INPUT REGISTER BITS |

It is clear that the microprogram sequencer of the preferred embodiment as shown in FIG. 4 and FIG. 5 permits a 16-way jump to be made at any step of the microprogram in accordance with the values of the four address alteration signals RA3' through RA6'.

At this point an example will be given to illustrate the manner in which the successive microinstructions which implement a machine instruction are generated. In the example given, the machine instruction is an ADD instruction, which is executed by five successive microinstructions requiring a total time of five clock periods. The discussion of this example will be facilitated by reference to FIG. 6 and Table II. FIG. 6 shows a number of signals vs. time as an ADD machine instruction is executed. The successive states or addresses for microinstructions are shown at the top of FIG. 6. Immediately below is a grouping 60 showing primary clock signal TO.

Below primary clock signal TO there is shown a group 64 of address signals RA0 through RA8 as shown in FIG. 4.

Below the group 64 of address signals there is shown in FIG. 6 a group 66 of branch enable signals RBRE3–RBRE6 and a group 68 of branch select signals RBRS0–RBRS2.

TABLE II

PERFORMANCE OF ADD INSTRUCTION

| Instruction No. | 0 | 21 | 115 | 6 | 7 | 0 |
|---|---|---|---|---|---|---|
| Mnemonic | LDIR | ALNP1 | ALNP2 | MR6 | MR7 | LDIR |
| Branches Enabled in Hexadecimal (Value of RBRE3–RBRE6) | F | 0 | 0 | 3 | F | F |
| Branches Selected in Octal (Value of RBRS0–RBRS2) | 0 | 0 | 0 | 4 | 3 | 0 |
| Normal Next Instruction No. (Unaltered octal value of RA0–RA7) | 1 | 115 | 6 | 7 | 0 | 1 |

In the top row of Table II are shown the numbers which identify the successive machine states or microinstructions at successive clock periods of clock signal TO. As mentioned above, the microsequencer begins the execution of each machine instruction at the same starting point, namely with microinstruction No. 0. The second row of Table II shows the mnemonic associated with each of the microinstructions. The third row of Table II indicates, in a manner which will later be explained, the number of different ways in which the program can branch at each stage. The fourth row in Table II indicates the status signal(s) which will determine any enabled branch, and the last row of Table II shows the normal next address which would be chosen in the absence of branching. The last three rows of Table II are the outputs of the PROMs A and F of FIG. 4 and comprise, respectively, the value (in hexadecimal) of RBRE3–RBRE6, the value (in octal) of RBRS0–RBRS2, and the unaltered value of RA0–RA7.

MICROINSTRUCTION 0

As noted above, the ADD instruction starts with the microinstruction 0. From the first column of Table II it is seen that the normal next instruction would be instruction No. 1 in the absence of branching. (However, from the first row of Table II it is seen that the second microinstruction is No. 21, so that it would appear that some branching will occur.) From the third row of Table II it is noted that a 16-way branch is enabled, as denoted by the F, which expressed in binary code is 1111, each digit corresponding to one of the branch enable signals R.BRE3 through R.BRE6. Thus, with reference to FIG. 5, it is seen that outputs are enabled from all four of the selectors B, C, D, and E. From the fourth line in Table II, it is seen that the branch select signals have a value of zero or 000, which means that the outputs of the selectors B, C, D, and E will be determined from the state of the signals on the input terminal designated 0 of each of the selectors. The first of these signals is the parity error signal, PARER, shown on selector C in FIG. 5. If a parity error has been sensed, a jump from the normal next instruction is required. The second of the signals examined indicates whether the instructions are organized in a page mode. Again, if this condition is detected, a branch would be called for. The third signal examined is I0, an input to the selector B of FIG. 5. I0 is the most significant bit of the machine instruction register, and this bit signifies whether the machine instruction is a memory reference instruction or an arithmetic instruction. The fourth status signal examined by the selector E of FIG. 5 indicates whether the machine instruction is an input/output instruction or another type of instruction.

In the example at hand, there was no parity error, the instructions were not in a page mode, and the machine instruction was not an input/output instruction. However, the machine instruction was an arithmetic instruction and this causes a branching to occur away from the normal next instruction. That is, a branching away from the state No. 1 to the state No. 21. This is accomplished by altering (to a 1) the digit of RA4 of the first instruction. This has the effect of adding 20 (octal) to the normal next instruction number, thereby generating the number 21 as the number of the second state or microinstruction (in octal).

Considering in more detail the method used in the present invention for generating the number of the next state, each address, represented by the digits RA0 through RA8 may be thought of as constituting a binary number of nine digits (whose octal value may be expressed in 3 digits).

The address alteration signals RA3' through RA6' have the potential of altering the fourth through the seventh digits of the binary address. When RA3' has been enabled, a one is placed in the fourth position in the address, and this is equivalent to adding binary 1000 (octal 10) to the address. If the address alteration signal RA4' has been enabled, a binary 10000 (octal 20) is added to the address. Similarly, when RA5' and RA6' are enabled, the address is incremented by binary 100000(octal 40) and by 1000000 (octal 100) respectively. Thus, the method used in the present invention to generate the next state number can be thought of as either altering predetermined bits of the address, or as incrementing the number representing the address by predetermined amounts.

MICROINSTRUCTION 21

Returning now to the example, in the state No. 21, of the second column of Table II, no branching is enabled and the normal next instruction number is 115. Therefore, the program proceeds unconditionally to the state 115 as indicated at the top of the third column in Table II.

MICROINSTRUCTION 115

Again, no branching is enabled in the state 115 and the normal text instruction is number 6 as indicated at the top of the fourth column in Table II. In the third row of the fourth column there is a number 3, which in binary is expressed as 0011. This denotes that the enable signals R.BRE3 and R.BRE4 of FIG. 5 are activated. In the fourth row of the fourth column of Table II, the figure 4 appears. This indicates that the status signals on the fourth terminals of the selector B and E will be examined. In this particular example, those signals are the signals STOP and XCPR respectively. As it happens in the example at hand, neither of these signals is present, and therefore, although branching has been enabled, no branching in fact occurs.

MICROINSTRUCTION 7

The program then proceeds to the normal next state number 7, as shown in the fifth column of Table II. It is noted that the hexadecimal number F appears in the third row of the fifth column of Table II. This number, expressed in binary code as 1111 indicates that all four of the branch enable signals R.BRE3 through R.BRE6 are activated. Also, the number 3 appears at the fourth row of the fifth column of Table II, indicating that the status symbols on the third terminal of each of the selectors B, C, D, and E will be examined. It should be noted that since the state 7 is the last state in the sequence that executes the ADD machine instruction, it is desirable for the computer to check to determine whether any relatively high priority items require action. From FIG. 5, it is seen that the signals examined (if present) indicate the need for memory refreshing, data channel request, high speed interprocessor bus service request, and interrupt. If any of these high priority items needs attention, the program will jump to attend to them following the execution of state 7. It is noted that the normal next instruction is number 0, and, in the example at hand, none of the high priority items required attention and so the program progressed to the normal next instruction numbered 0, as indicated in the sixth column of Table II. In this manner, the microprogram has advanced through five states in executing the ADD instruction and has returned to the state 0 at the conclusion of the ADD instruction.

Referring now to FIG. 6, by way of review, the groups 64, 66, 68 show respectively the next addresses, the branch enable signals and the branch select signals in each of the successive states indicated at the top of FIG. 6. At each clock period, the address signals generated are applied to microprogram PROM 5 to generate control signals which control the operation of the computer, causing a sequence of operations to take place that result in the progressive execution of the ADD machine instruction.

Thus, there has been described a microprogram sequencer which differs from microsequencers of the prior art in that no mapping PROM is required, nor is it necessary to have a microsequencer counter and a microsequencer incrementer. Instead, the address produced at each clock period is a normal next address, but if any branching is possible, this normal next address is alterable within the same clock period by address alteration signals that are generated in response to a number of sensed conditions and machine instruction register bits. This mode of operation of the present invention permits it to execute jump instructions or branching operations more efficiently then prior art machines since the microsequencer of the present invention can perform the branch during the same clock interval, rather than having to load an alternate address into a memory during a first clock cycle and then proceeding to the alternate address in a second clock interval. Thus, a clock interval of time is saved each time the microsequencer of the present invention executes a branch operation. For this reason, the microsequencer of the present invention permits faster operation of the computer. Moreover, a conditional branch can be made to any of a large number of different microinstructions (e.g., a 16-way branch in the present embodiment) rather than being limited to a 2-way selection between the next sequential address and an alternate address as in the prior art. Thus, much greater flexibility in conditional branching is achieved.

The foregoing detailed description is illustrative of a preferred embodiment of the invention, and it is to be understood that additional embodiments thereof will be obvious to those skilled in the art. The embodiments described herein together with those additional embodiments are considered to be within the scope of the invention.

What is claimed is:

1. A microprogram sequencer for generating in a proper sequence, including required branching, the addresses of the successive microinstructions used in executing a given machine instruction by a computer of the type in which status signals are produced which represent the status of various components of the computer, and in which the operation of the various components is synchronized by a clock which generates a periodic clock signal demarking successively occurring machine cycle clock periods, said microprogram sequencer comprising in combination:

address generator memory means for producing during a current machine cycle period a first set of output signals including a first code set of signals designating a normal next input address for said address generator memory means;

selector means receiving as inputs applied status signals, instruction signals, and predetermined ones of the set of output signals produced by said address generator memory means, and responsive to the received signals during the current machine cycle period for selectively producing address alteration signals during the current machine cycle period;

means for logically combining said address alteration signals and said first code set of signals designating a normal next address during the current machine cycle period to selectively alter the first code set of signals to represent an altered next input address, any alteration of the first code set of signals being established before the end of the current machine cycle period; and means for applying the first code set of signals to said address generator memory means during the current machine cycle period as the input address thereto, said address generator memory means being responsive to such application of the first code set of signals, whether altered or unaltered, for producing during the next successive machine cycle period a selectively corresponding second set of output signals including a second code set of signals designating the next successive normal input address for said address generator memory means.

2. The microprogram sequencer of claim 1 wherein the first code set of signals also designates a corresponding normal microinstruction which is to be executed at the end of the current machine cycle period and wherein any alteration during the current machine cycle period of the first code set of signals to produce an altered next input address also alters the correspondingly designated microinstruction before the end of the current machine cycle period.

3. The combination of claim 1 wherein said address generator memory means comprises at least one programmable semiconductor memory chip and a semiconductor register for storing the set of output signals including the first code set of signals read out from the memory means, the register presenting at least a predetermined subset of the first code set of signals at open collector outputs thereof, and wherein the selector means comprises semiconductor gating circuitry which produces the address alteration signals at open collector outputs thereof.

4. The combination of claim 1 wherein the first code set of signals is a set of individual bit signals and the address alteration signals comprise a predetermined plurality of individual address alteration signals corresponding respectively to a predetermined plurality of the bit signals of the first code set of signals, said means for logically combining operating to combine each address alteration signal with the corresponding bit signal to selectively alter the corresponding bit signal.

5. The combination of claim 4 wherein the address alteration signals comprise four individual address alteration signals corresponding respectively to a predetermined four of the bit signals of the first code set of signals, thereby enabling a sixteen way selectively alterable branch to the next microinstruction address at the end of the current machine operating cycle period.

6. The combination of claim 1 wherein the first set of output signals includes the first code set of signals and a set of branch control signals, said selector means being responsive to the branch control signals, the applied status signals and instruction signals for selectively producing the address alteration signals.

7. A method of generating during successive machine cycle clock periods in a proper sequence from an addressable microinstruction memory means the corresponding successive microinstructions used in executing a given machine instruction by a computer of the type in which status signals are produced which represent the status of various components of the computer, said method comprising the steps of:

(a) during a current machine cycle clock period deriving from the current microinstruction a normal next input address to the microinstruction memory means;

(b) generating during the current machine cycle period address alteration signals in response to the status signals and in relation to the machine instruction being executed;

(c) combining during the current machine cycle period the address alteration signals with the normal next input address to obtain a selectively altered next input address, any selectively altered next input address being established before the end of the current clock cycle period; and (d) applying the next input address whether altered or unaltered, to the microinstruction memory means during the current machine cycle clock period to select the next successive microinstruction from the microinstruction memory means.

* * * * *